United States Patent [19]
Vidal et al.

[11] Patent Number: 5,149,552
[45] Date of Patent: Sep. 22, 1992

[54] CALCIUM CITRATE ANTICAKING AGENT

[75] Inventors: Susan Vidal, Patterson; Fouad Z. Saleeb, Pleasantville, both of N.Y.

[73] Assignee: Kraft General Foods, Inc., Northfield, Ill.

[21] Appl. No.: 704,500

[22] Filed: May 23, 1991

[51] Int. Cl.$^5$ .................. A23L 2/38; C07C 59/265
[52] U.S. Cl. ................................ 426/321; 426/590; 562/584
[58] Field of Search ................ 426/321, 590; 562/584

[56] References Cited

U.S. PATENT DOCUMENTS 4,814,177  3/1989  Walsdorf et al. .................. 424/464
4,851,221  7/1991  Pak et al. .......................... 424/693

OTHER PUBLICATIONS

Hawley, The Condensed Chemical Dictionary, 10th Ed., 1981, Van Nostrand Reinhold Co.: N.Y., p. 180.

*Primary Examiner*—Joseph Golian
*Attorney, Agent, or Firm*—Linn I. Grim

[57] ABSTRACT

A new and useful calcium salt of citric acid is prepared and is used as an anticaking agent in fructose-sweetened powdered soft drinks. Also included are the processes for preparing the new calcium salt and powdered beverage mixes containing the new salt.

15 Claims, No Drawings

CALCIUM CITRATE ANTICAKING AGENT

This invention relates to a new and useful calcium salt of citric acid, and use of this salt as an anticaking agent in fructose-sweetened powdered soft drinks, as well as the process of preparing the new calcium salt.

Dry beverage mixes containing sweetener, food acid, flavor and flow agent are well known. Generally, the primary sweetener in beverages has been sucrose, glucose or artificial sweeteners.

While sucrose is effective to sweeten foods, nutritional reasons have recently inspired a reduction in the sucrose and/or total sugars content of some presweetened foods, especially beverages. To provide traditional levels of sweetness at reduced weight concentrations, sweeteners having more sweetening power per unit weight than sucrose (i.e., having higher relative sweetness) must be employed. While certain high Potency non-nutritive or "artificial" sweeteners have been suggested for use, both current food regulations and strong consumer prejudice against artificial sweeteners have directed art attempts at providing presweetened beverage mixed employing only nutritive, carbohydrate sweetening agents.

Since fructose is 10–17% sweeter than sucrose on an absolute basis and about 30% sweeter than sucrose in a 50/50 mixture, many attempts have been made to employ fructose as a sweetening agent for some foods. Fructose is commercially available in basically two forms, (1) high fructose corn syrup, (hereinafter "HFCS") normally a liquid, and (2) crystalline fructose which is a solid powder.

HFCS has the advantage of being relatively inexpensive compared to crystalline fructose and has been employed by soft drink manufacturers to reduce cost of their carbonated beverages. Use of HFCS as a major component for presweetened dry beverages in not practical since the 20% moisture content of the HFCS makes a sticky, caked, dry food mix.

Another problem with HFCS is that it is not as sweet as crystalline fructose. Fructose exists mostly in four forms as the alpha-furano, beta-furano, alpha-pyrano and beta-pyrano structures. The sweetness perception of fructose is, however, primarily a function of the amount of beta-pyrano form. Crystalline fructose, is usually manufactured as theoretically-pure, anhydrous beta-D-fructopyranose for this reason (although typical analysis indicate only 97.2% beta-pyranose). HFCS, on the other hand, is not as sweet as pure crystalline fructose since it is an amorphous mixture of these non-sweet fructose forms as well as the sweet form. HFCS, (basis on total fructose) also contains glucose which is less sweet than fructose. Therefore, crystalline fructose is substantially sweeter on a unit weight basis than HFCS (dry basis).

Use of crystalline fructose, while having more intense sweetness, does not overcome the hygroscopic nature of fructose mixtures. In addition, crystalline fructose is more expensive than sucrose, but less is needed which helps lower cost. Also, fructose is a reducing sugar unlike sucrose which is a non-reducing sugar. Reducing sugars are unstable in mildly alkaline solutions, while non-reducing disaccharides (e.g. sucrose) have their stability maxima in this pH region.

The prior art contains many examples of dry food mixes containing monosaccharides, acids, flavor and anticaking agents.

U.S. Pat. No. 4,199,610 entitled "Non-Hydroscopic Dry Instant Beverage Mixes" issued Apr. 22, 1980 to Hughes, et al. teaches the preparation of dry, stable, acidulated beverage mix made by adding phosphoric acid to pulverized (instead of granular) sugar, preferably pulverized fructose sugar, with particles from 1–100 microns, then drying the phosphoric acid mixture and grinding the dry cake.

U.S. Pat. No. 4,664,920 entitled "Method For Fixing Food Ingredients on a Magnesium Salt Substrate" issued May 12, 1987 to Saleeb, et al., used magnesium salts to fix juice solids, flavors, colors and high fructose corn syrup.

U.S. Pat. No. 4,541,873 entitled "Method and Manufacture For Easily Spray Drying Low Molecular Weight Sugars: to Schenz, et al., issued Sep. 17, 1985; teaches a method of complexing saccharides, including fructose, with metallic cations to improve resistance to humidity and improve flowability.

Another quick dissolving beverage is discussed in U.S. Pat. No. 4,343,819 entitled "Quick Dissolving Powdered Drink and Method Therefore", issued Aug. 10, 1982 to Wood, et al., describes a dry beverage mix having carbonates bound to sucrose particles.

In U.S. Pat. No. 4,273,695 entitled "Preparing Beverage Mix Containing Dextrose Hydrate and Coated Citric Acid", a free-flowing beverage mix is prepared by coating particles of food acid with a desicating agent such as silicon dioxide and then mixing the coated particles with a saccharide material.

Many of the mentioned prior art techniques employ special crystallization or drying techniques but the problems attributed to the hydroscopic nature of fructose, i.e., caking of the food mixture containing fructose, is not easily overcome. Many dry food formulations, such as dry soft drinks containing fructose as sweetening agent, contain anticaking agents, such as tricalcium phosphate and magnesium oxide. However, due to the alkaline nature of such agents when exposed to high relative humidity, especially at high temperatures, e.g., above 70° F. fructose browning reactions occur in such soft drink compositions. Tricalcium citrate in 10 aqueous suspensions provides an alkaline medium (pH 9–11) and is only available commercially as a hydrate containing about 13% water. Dicalcium citrate, on the other hand, is acidic in aqueous suspension but is difficult to dry and is relatively more hydroscopic than the present new salt of this invention. Magnesium oxide and calcium silicate similarly provide alkaline media in which fructose browning reactions occur.

The term "browning" as used herein in foods, is a general term used as an indication of instability of the product and the generalization of intermediate and in most cases undesirable reaction products. A color change is evident and is the major noticeable sign of deterioration.

In the case of the reducing sugar fructose in powdered soft drinks and particularly in the presence of high humidity/temperature (>70° F.) and in the presence of slightly alkaline ingredients (anticaking agents for example), a noticeable color change is observed. In a white mixture, yellow coloring starts to appear in a few weeks (or shorter time at >100° F.). This yellow color changes to light brown then dark brown accompanied by caking (loss of flow) and gumminess. If color is added to the powdered soft drink (e.g. grape), various color changes are noted (e.g. green, etc.).

In many powdered soft drinks, citric acid is commonly employed as an additive to increase the solubility of the soft drink composition components. The alkaline caking agents will, of course, be neutralized by the added citric acid to the extent present and be soluble at the pH range of the soft drink (pH=3–4). Magnesium oxide requires 9.6 pounds of citric acid per pound; tricalcium phosphate requires 2.68 pounds of citric acid per pound; and tricalcium citrate requires only 1.54 pounds of citric acid per pound for this purpose. The present new calcium citrate salt being acidic or neutral will consume less citric acid than the said prior art anticaking agents.

SUMMARY OF THE INVENTION

The present invention relates to calcium citrate salts of the formula:

$$Ca_n(C_6H_5O_7)_2$$

wherein "n" is a value from 2.5 to 2.95 and preferably 2.61 to about 2.92, the dry solid containing not greater than 6% water, and an aqueous slurry (1% by weight) of said salt in water at 25° C. having a pH value from about 4 to below about 7, and preferably from 4 to about 5.5.

The present new calcium citrate salts are prepared by spray drying a neutralization mixture prepared by neutralizing citric acid with a slurry of calcium oxide/or hydroxide in water, i.e., a slurry of calcium hydroxide under controlled conditions to assure the production of the present new calcium citrate salts. Temperature, slurry solid content and agitation time before spray drying are critical parameters in determining the physical characteristics of final product.

In a further aspect, the present invention also provides stable dry powered soft drinks which are sweetened with fructose.

DETAILED DESCRIPTION OF THE INVENTION

The production of the present new calcium citrate salts is accomplished by neutralization of citric acid with calcium hydroxide while controlling the rate and conditions of the reaction as well as the degree of neutralization. In the present process, a calcium hydroxide aqueous slurry is reacted with a citric acid solution in water resulting in a strong exothermic reaction. The rate of reaction, concentration of reactants and drying conditions are all important factors in producing calcium citrate salts of the desired pH values, moisture content and particle size.

It is preferred to form two separate aqueous slurries of citric acid and calcium hydroxide and then mix the uniform slurry of calcium hydroxide with the aqueous citric acid. The temperature of the mixture is not allowed to exceed about 60° C. The pH of the slurry so produced after thorough mixing should fall within the range of 4–6 and, if needed, should be adjusted to this range of pH. The slurry is then used in the spray-drying step.

The present new calcium citrate salts are very insoluble in water providing about 0.1% by weight solution at ambient temperature and slightly more soluble in hot water. During preparation of a batch and while waiting for spray drying of the batch, the salts are present in the insoluble form, a slurry of tiny crystals which form aggregates of varying particle size ranging from 5 to 100 microns. In present experience, the best products are obtained by using the following conditions. The solids level of the aqueous slurry of new calcium citrate salt is maintained at 20–26% and preferably at 22–24% by weight based on anhydrous salt. The slurry temperature during spray drying is from 80°–100° F. and preferably 80°–90° F. To avoid gels forming in the aqueous slurry, especially at temperature below 70° F., and recrystallization which can occur on prolonged storage, spray drying of the aqueous slurry is effected within about 4–5 hours after slurry preparation. The slurry is spray dried at an inlet temperature of from about 425° to about 460° F. to deliver a free-flowing white powder with a moisture content of less than 6% and a bulk density of from about 0.3 to about 0.7 g/cc. Extensive mixing and especially homogenization of the spray dried product should be avoided since the particles of salt may be broken down into fine particles.

The new calcium citrate salts of this invention generally have the following characteristics:

| | |
|---|---|
| Moisture | 6.00% maximum |
| Bulk Density | 0.33–0.66 g/cc |
| Granulation | 95% through U.S. 100 mesh or 150 microns |
| Rotatap, 8 min. | 10% maximum through U.S. 400 mesh or 38 microns |
| PH (1% by weight solution) | 4.0–6.5 |
| Appearance | free-flowing, white powder |

The present new salts are neutral or slightly acidic having a low moisture content, do not undergo any significant gain or loss of water during storage and have a well defined crystal size to effectively act as an anticaking agent or spacer between the relatively more hygroscopic fructose crystals.

The stable dry powdered soft drinks of this invention contain sucrose fructose, flavors, a crystalline food acid and the new calcium citrate salts as anticaking agents. It is generally preferred to employ fructose having less than 10% of particles of less than 150 microns.

In preferred compositions, crystalline fructose should contain less than 8%, preferably less than 5% and most preferably less than 2% of particles smaller than 150 microns. Crystalline sweeteners such as sucrose or crystalline fructose which have low water activity should be used. The fructose and sucrose content of the mix can range from 10–60% and 20–80% by weight respectively. The combined weight of fructose and sucrose will usually be at least 40% for soft drinks. Normal levels of fructose and sucrose in these compositions will be at least about 90% and usually about 95% or more of the soft drink mix, especially fruit-flavored mixes.

The crystalline food acids employed are usually low water activity and include citric, malic, tartaric, fumaric, adipic and the like, at levels from about 0.5 to about 10% of the composition.

The flavor used in the present soft drink mixes can be any suitable flavor of low water activity, preferably at or below 0.4 and most preferably at or below 0.36 measured at 90° F. Some flavors can have a water activity approaching that of fructose and the food acid in the mix.

Spray dried flavors, normally fixed in maltodextrin must be modified to reduce their water activity. It has been found that 20–80%, preferably 30–60% of a modified starch may replace a similar amount of malto-dextrin to produce suitable flavors having low water activity. A typical spray-dried flavor for use in this invention contains 30–60% malto-dextrin and flavorant.

A typical fixed flavor can be about 40% chemically modified food starch, about 40% malto-dextrin, and about 20% lemon oil is mixed with 40% "N-LOC" modified starch manufactured by National Starch and 40% "LODEX" hydrolyzed corn syrup supplied by Amaizo, American Maize Products, Hammon, Ind. When mixed in an aqueous suspension or solution and spray dried, there is produced a lemon flavor with a water activity below 0.36, most preferably below 0.34.

A dry soft drink composition may be prepared in the following manner. Minor ingredients such as vitamins, colors, buffers, sweetness enhancers and the new calcium citrate salt are added to the acid already placed in a ribbon mixer. The premix is blended for 20 minutes or more to obtain a uniform blend. Each ingredient is fed separately into the blender through a coarse screen which is used to distribute the material onto the surface of the acid.

The premix is then added with the major ingredients of fructose and flavor, using Merrick TM Scale Feeders, to a continuous mixing screw where the ingredients are homogeneously blended without excessive handling which would produce fines. The dry mix is stored in large containers and transported, when needed, to packaging. Rough treatment of the prepared mix is avoided and the temperature and humidity of the ambient atmosphere are controlled to reduce exposure of the mix to moisture. The mix is packaged depending on the product and its serving size.

The following examples are provided to further illustrate the present invention.

EXAMPLE 1

A calcium citrate sample was prepared by reacting 2763.8 lbs. of citric acid with 1600 lbs. calcium hydroxide (97–98% $Ca(OH)_2$ by analysis) in the presence of 1250.5 gallons of water. The mole ratio of calcium hydroxide to citric acid was very slightly less than 3:2, actually 2.92:2. The citric acid (Pfizer fine grannular, food grade) was mixed in a large batch tank with 600 gallons of cold water. The calcium hydroxide (Mississippi Lime, hydrated lime, food codex) was mixed in a separate batch tank with 600 gallons of cold water. The calcium hydroxide slurry is then pumped into the citric acid solution at a rate to deliver the entire slurry in 10–15 minutes. It is necessary to have good agitation during the entire reaction and mixing process. The remaining 50.5 gallons of water is used to rinse the calcium hydroxide tank and transport lines. Due to the heat of reaction, the temperature of the resultant slurry was increased from an initial value of 15° C. (60° F.) to a maximum of 57° C. (134° F.). After the reaction is complete, the batch is cooled to 80°–90° F. The final pH of this concentrated slurry should fall within the range 3.8–4.6 or can be adjusted up or down using the reacting ingredients. The slurry is then dried via spray drying utilizing a rotary wheel (7600 rpm). The outlet temperature was adjusted to 225° F. and the inlet temperature was 450° F.

The calcium citrate powder obtained after spray drying was a free-flowing white powder with a moisture less than 6.0% and a bulk density in the range 0.4–0.65 g/cc. The pH of 1% slurry in water was 5.5. 95% of the powder passed through U.S. 100 mesh.

EXAMPLE 2

Experimental results are given below when anhydrous citric acid was neutralized using basic calcium salts (oxide or hydroxide). No calcium carbonate was used because of the large volumes of carbon dioxide that will be released during the reaction. The table gives the number of mols of calcium oxide or hydroxide added to 2 mols of citric acid and the pH of a 1% aqueous slurry of the resultant spray dried calcium citrate salt. (After reaction, agitation and spray drying as described in Example 1, 1 g of the resultant calcium citrate salt was dispersed in 100 ml distilled water for pH measurements.)

TABLE I

| MOLAR RATIO OF CITRIC:CALCIUM IN CALCIUM CITRATE | | |
| --- | --- | --- |
| Citric Acid (Mol) | Calcium (Mol) | pH (1% Slurry in Water) |
| 2 | 2.375 | 3.95 |
| 2 | 2.613 | 4.04 |
| 2 | 2.850 | 4.64 |
| 2 | 2.910 | 5.25 |
| 2 | 2.910 | 5.33 |
| 2 | 2.92 | 5.5 |
| 2 | 2.99 | 7.28 |

Commercially available tricalcium citrate (3) calcium mols to 2 mols citric; $Ca_3 (Cit)_2$ shows a pH of 9–11 (a 1% slurry in water at 25° C). It is evident from the table that the composition range of our calcium citrate (slurry pH between 4 and 7) is $Ca_{2.5} (Cit)_2$ to $Ca_{2.95} (Cit)_2$ for pH values in the range of 4–7.

The new calcium citrate salts of this invention are distinct from tricalcium citrate which is commercially available (Pfizer, Inc.) as is obvious from the following data:

| Commercial Tricalcium Citrate (Pfizer, Inc) | | New Calcium Citrate Salts of The Invention |
| --- | --- | --- |
| 10.66 | Moisture % | Less than 5.5 |
| 17.64 | % Ca | 22.16 |
| 19.74 | % CA (dry wt.) | 23.7 |
| 9–11 | pH | 4–7 |

EXAMPLE 3

Fructose and Anticaking Agents

Neutral/slightly acidic calcium citrate of example I was dry blended at the level of 2% with crystalline fructose (14 grams tricalcium citrate and 700 g. fructose) in a small ribbon blender for 20 minutes in an air conditioned room. The sample was subdivided into glass jars and lids were closed. The closed glass jars were stored under three conditions: a) room temperature, b) 90° F./85% RH and c) 110° F./70% RH. For storage times of up to 10 weeks. None of the tricalcium citrate - fructose samples showed any sign of browning (color change) or gumminess. On the other hand, fructose samples coated with the anticaking agents of magnesium oxide and alkaline tricalcium citrate stored under the same conditions showed significant color changes and stickiness. The higher the temperature, the faster the color change.

Fructose sweetened powdered soft drinks of different flavors were prepared utilizing various anticaking agents. The stability of the various products were checked in a pantry storage study (90° F./70% RH). The following results were obtained for grape and cherry flavored drinks.

| | |
|---|---|
| Fructose (wt.) | 16% |
| Sucrose | 81% |
| Citric acid | 2.4% |
| Anticaking | 0.3% |
| Flavor/Vitamins | 0.3% |

Calcium citrate of Example 1 was used as a neutral/slightly acidic anticaking agent vs. magnesium oxide and calcium silicate as slightly alkaline anticaking agents. The pantry test studies clearly showed that neutral/slightly acidic citrate is the much better anticaking agent for fructose - containing dry beverages. Not only the color of the products were retained (no browning) but also the ease of scooping of the products, even after 6 weeks at accelerated pantry conditions were observed.

What is claimed is:

1. A reaction product of a calcium compound selected from the group consisting of calcium hydroxide, calcium oxide and calcium carbonate with citric acid wherein said reaction product has a mole ratio of calcium to citric acid from 2.5:2 to 2.95:2 and a pH value in a 1% water slurry of said reaction product from about 4 to below 7 at 25° C.

2. A reaction product of claim 1 having a mole ratio of calcium to citric acid from 2.61:2 to 2.92:2.

3. The reaction product of claim 1 having a pH value in a 1% water slurry of said reaction product from about 4.0 to about 5.5.

4. The reaction product of claim 1 having a moisture content no greater than 6 weight percent.

5. The reaction product of claim 1 having a moisture content no greater than 5.5 weight percent.

6. The reaction product of claim 4 having a pH value in a 1% water slurry of said reaction product from about 4.0 to about 5.5.

7. A dry, flavored, powdered fructose-containing soft drink composition comprising as an anti-caking agent therefor a reaction product of a calcium compound selected from the group consisting of calcium hydroxide, calcium oxide and calcium carbonate with citric acid wherein said reaction product has a mole ratio of calcium to citric acid from 2.5:2 to 2.95:2, a pH value in a 1% water slurry of said reaction product from about 4.0 to below 7 at 25° C. and said reaction product having a moisture content no greater than 6 weight percent.

8. The composition of claim 7 wherein said the reaction product has a mole ratio of calcium to citric acid from 2.61:2 to 2.92:2.

9. The composition of claim 7 wherein said reaction product has a pH value in a 1% water slurry from about 4.0 to 5.5.

10. The composition of claim 7 wherein the dry form of said reaction product contains no more than 5.5% water.

11. The composition of claim 7 further comprising a food acid and a flavor.

12. A method of stabilizing a fructose-containing dry food mix against caking during storage which comprises blending in homogeneous and intimate contact, sucrose, crystalline fructose having 10% or less of particles smaller than 150 microns, a dry flavor, said flavor having a matrix with a water activity of less than 0.36 when measured at 90° F. and a reaction product of a calcium compound selected from the group consisting of calcium hydroxide, calcium oxide and calcium carbonate with citric acid wherein said reaction product has a mole ratio of calcium to citric acid from 2.5:2 to 2.95:2, a pH value in a 1% water slurry of said reaction product from about 4 to below 7 at 25° C. and the dry form of said reaction product containing no greater than 6% water.

13. The method of claim 12 wherein the flavor is a spray-dried flavor comprising about 30 to about 60% modified food starch, about 30 to about 60% malto-dextrin, the remainder flavor and said reaction product having a mole ratio of calcium to citric acid of 2.61:2 to 2.92:2.

14. The method of claim 12 wherein the fructose is present from about 10 to about 60% and the sucrose is present from about 20 to about 80%.

15. The method of claim 14 wherein the food mix is a beverage mix and the combination of sucrose and fructose is at least 90% of the mix.

* * * * *